United States Patent
Desai et al.

(10) Patent No.: US 8,621,004 B2
(45) Date of Patent: Dec. 31, 2013

(54) METHOD AND SYSTEM FOR TRANSFER OF CALLS FROM AN IP BASED PHONE

(75) Inventors: Prashant B. Desai, Land O'Lakes, FL (US); Juan M. Vasquez, Gibsonton, FL (US); Mayuresh M. Hegde, Irving, TX (US); Parind S. Poi, Lewisville, TX (US); Haridas Bhogade, Plant City, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 662 days.

(21) Appl. No.: 12/565,905

(22) Filed: Sep. 24, 2009

(65) Prior Publication Data
US 2011/0069827 A1 Mar. 24, 2011

(51) Int. Cl.
*G06F 15/16* (2006.01)
*H04M 3/42* (2006.01)
*H04L 12/66* (2006.01)

(52) U.S. Cl.
USPC ............................ 709/204; 709/245; 370/352

(58) Field of Classification Search
USPC .......... 709/204, 201, 203, 245; 370/350–356, 370/400, 401, 466, 503, 260; 379/900, 379/142.04, 142.06, 142.07, 211.01, 379/211.02, 212.01
See application file for complete search history.

(56) References Cited

U.S. PATENT DOCUMENTS

| | | | |
|---|---|---|---|
| RE38,596 E * | 9/2004 | Hallock et al. | 370/264 |
| 6,870,841 B1 * | 3/2005 | Brown et al. | 370/389 |
| 7,583,659 B2 * | 9/2009 | Matsuhashi et al. | 370/352 |
| 7,957,509 B2 * | 6/2011 | Crockett et al. | 379/88.03 |
| 2003/0095541 A1 * | 5/2003 | Chang et al. | 370/352 |
| 2004/0264673 A1 * | 12/2004 | Novack | 379/221.11 |
| 2007/0110033 A1 * | 5/2007 | Tu et al. | 370/352 |
| 2007/0201409 A1 * | 8/2007 | Kandlur et al. | 370/338 |
| 2008/0162705 A1 * | 7/2008 | Cai et al. | 709/228 |
| 2008/0291901 A1 * | 11/2008 | Stratton et al. | 370/352 |
| 2010/0202450 A1 * | 8/2010 | Ansari et al. | 370/389 |

* cited by examiner

*Primary Examiner* — Ruolei Zong

(57) ABSTRACT

A system for and method of providing a call transfer is presented. In one exemplary embodiment, the system and method of providing a call transfer may comprise receiving, via a network interface, a call at an IP based phone, the call originating from outside a network of the IP based phone, parsing one or more portions of call information to identify a unique network interface indicator associated with the network interface, receiving a request to transfer the call, and transferring the call to the network interface using the unique network interface indicator.

19 Claims, 3 Drawing Sheets

METHOD AND SYSTEM FOR TRANSFER OF CALLS FROM AN IP BASED PHONE

BACKGROUND INFORMATION

Transferring calls to an appropriate media gateway from a packet based network is challenging. A call from an external network to a packet based network, such as an IP based network will use a gateway (e.g., a media gateway), a Session Border Controller (SBC), or another interface between the networks. Calls are frequently transferred back out of the packet based network (e.g., to another packet based network, to a Time Division Multiplexing (TDM) based network, or other network). The transferred call often results in a call routed back out of the network through a second media gateway, a Session Border Controller (SBC), or other interface. This results in the call continuing to use resources of the network from which it was transferred. For example, two telephony or IP trunks connected to the media gateways or the session border controllers will continue to carry the call as will the corresponding ports and a portion of the internal network (i.e., the network from which the call was transferred). This results in wasted resources and a portion of a network being used for an external call (i.e., no parties to the call are on the network). The use of the network also exposes the administrators, owners, users, or others associated with the network to liability for a call instead of handing the responsibility off to the network or networks who are parties to the call. For example, there is a risk that the call may be sniffed or otherwise monitored while traveling across the network.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

Reference will now be made in detail to exemplary embodiments, examples of which are illustrated in the accompanying drawings. It should be appreciated that the same reference numbers will be used throughout the drawings to refer to the same or like parts. It should be appreciated that the following detailed description are exemplary and explanatory only and are not restrictive.

An exemplary embodiment provides a system for transferring calls from a packet based phone. The system for transferring calls from a packet based phone may provide improved call handling.

Figure 1:
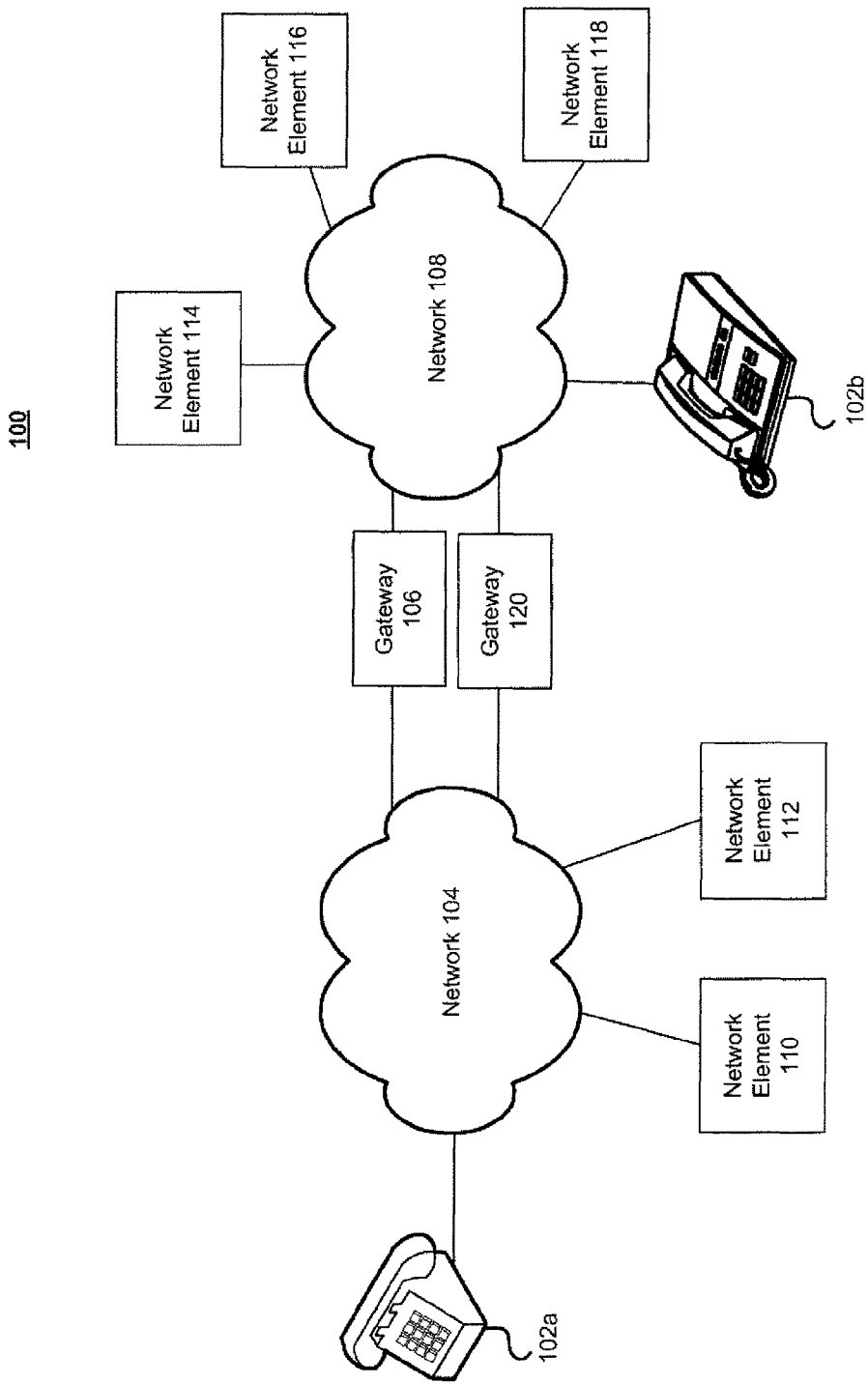
FIG. 1 is a schematic of a system for transferring calls from a packet based phone, in accordance with an exemplary embodiment.

Referring to FIG. 1, a system for transferring calls from a packet based phone in accordance with an exemplary embodiment is illustrated. System 100 illustrates an exemplary system for improving call handling associated with a packet based phone. As illustrated, the system 100 may include one or more networks, such as network 104 and network 108. Networks 104 and 108 may be communicatively coupled to the gateways 106 and 120. One or more telecommunication devices 102a and 102b may be communicatively coupled to networks 104 and 108. Other network elements, such as network elements 110, 112, 114, 116, and 118 may be communicatively coupled to networks 104 and/or 108.

The telecommunication devices 102 may be a wireline phone, a wireless phone, a satellite phone, Personal Digital Assistant (PDA), computer, or other telecommunication capable devices. The telecommunication devices 102 may be communicatively coupled to the network 104 and 108. The telecommunication devices 102 and network elements 110, 112, 114, 116 and 118 may send and receive data using one or more protocols. For example, data may be transmitted and/or received using Wireless Application Protocol (WAP), Multimedia Messaging Service (MMS), Enhanced Messaging Service (EMS), Short Message Service (SMS), Global System for Mobile Communications (GSM) based systems, Time Division Multiplexing (TDM) based systems, Code Division Multiple Access (CDMA) based systems, Transmission Control Protocol/Internet (TCP/IP) Protocols, or other protocols and/or systems suitable for transmitting and receiving data. Data may be transmitted and/or received wirelessly or may utilize cabled network connections or telecom connections such as an Ethernet RJ45/Category 5 Ethernet connection, a fiber connection, a traditional phone wireline connection, a cable connection or other wired network connection. Network elements 110, 112, 114, 116, and 118 may use standard wireless protocols including IEEE 802.11a, 802.11b and 802.11g. Network elements 110, 112, 114, 116, and 118 may also be communicatively coupled via protocols for a wired connection, such as an IEEE Ethernet 802.3.

Networks 104 and 108 may be one or more of a wireless network, a wired network or any combination of wireless network and wired network. For example, networks 104 and 108 may include one or more of a fiber optics network, a passive optical network, a cable network, an Internet network, a Public Switched Telephone Network (PSTN), a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and/or receiving a data signal. In addition, networks 104 and 108 may include, without limitation, telephone line, fiber optics, IEEE Ethernet 802.3, a wide area network ("WAN"), a local area network ("LAN"), or a global network such as the Internet. Also networks 104 and 108 may support an Internet network, a wireless communication network, a cellular network, or the like, or any combination thereof. Networks 104 and 108 may further include one, or any number of the exemplary types of networks mentioned above operating as a stand-alone network or in cooperation with each other. Networks 104 and 108 may utilize one or more protocols of one or more network elements to which they are communicatively coupled. Networks 104 and 108 may translate to or from other protocols to one or more protocols of network devices. Although networks 104 and 108 are each depicted as a single network, it should be appreciated that according to one or more embodiments, networks 104 and 108 may each comprise a plurality of interconnected networks, such as, for example, a service provider network, the Internet, a broadcaster's network, a cable television network, corporate networks, and home networks.

Network elements 110, 112, 114, 116, and 118 may each be one or more servers (or server-like devices), such as a Session Initiation Protocol (SIP) server. Network elements 110, 112, 114, 116, and 118 may be telecom switches, Private Branch Exchanges (PBXs), Voice Response Units (VRUs), announcement servers, voice mail servers and/or voice portals. Network elements 110, 112, 114, 116, and 118 may be VoIP (Voice Over Internet Protocol) enabled devices. Network elements 110, 112, 114, 116, and 118 may include one or more processors (not shown) for recording, transmitting, receiving, and/or storing data. Although network elements 110, 112, 114, 116, and 118 are depicted as individual servers, it should be appreciated that the contents of network elements 110, 112, 114, 116, and 118 may be combined into fewer or greater numbers of servers (or server-like devices) and may be connected to one or more data storage systems (not shown). Data storage systems may be local or remote to network elements 110, 112, 114, 116, and 118.

Gateways 106 and 120 may be media gateways or Session Border Controllers (SBCs) interconnecting two or more networks. For example, gateway 106 and 120 may allow the routing of calls and other data between network 104 and network 108. Gateways 106 and 120 may allow the routing of calls between different network types such as between a circuit switched network and a packet switched network. In one or more embodiments, gateway 106, gateway 120, or both gateways may be replaced by one or more switches (not shown) connecting two IP networks. In other embodiments, gateway 106, gateway 120, or both gateways may be replaced by one or more switches (not shown) connecting two circuit switched networks. In some embodiments, gateway 106, gateway 120, or both gateways may be replaced by one or more switches (not shown) connecting two portions of the same network.

According to some embodiments, the telecommunication device 102b may be an IP phone and network 108 may be an IP based network. The telecommunication device 102b may be capable of identifying and storing information identifying call information received during call setup. For example, the telecommunication device 102b may identify and store a unique identifier corresponding to a media gateway, a Session Border Controller (SBC), or other interface routing a call to the telecommunication device 102b. According to one or more embodiments, call setup information may be used to identify a unique identifier the media gateway, session border controller, or other interface routing the call to the telecommunication device. The call setup information used to identify a unique identifier may include a Session Initiation Protocol (SIP) Re-Invite message information, Session Description Protocol (SDP) information, or other call setup information. The unique identifier corresponding to a media gateway, a Session Border Controller, or other interface routing a call to the telecommunication device 102b may include an IP address, a fully qualified domain name, or other unique identifier enabling call routing. Telecommunication devices 102a and 102b may contain volatile memory, non-volatile memory, or other storage for storing an identifier associated with a media gateway, a session border controller, or other interface.

For example, a user of the telecommunication device 102b may receive a call from a user of the telecommunication device 102a. The call may be routed through the gateway 120. The user of the telecommunication device 102b may decide to transfer the call to a destination back on network 104, for example, to network element 112. The telecommunication device 102b may use a stored unique identifier such as, for example, the fully qualified domain name of gateway 120 or an IP address of gateway 120 to transfer the call back to gateway 120. This may ensure that the outbound call leg from the network 108 goes through the same media gateway, session border controller, or interface as the inbound call leg to network 108 instead of an alternate media gateway such as gateway 106. This may allow a media gateway, session border controller, or interface to transfer a call off of network 108 and free the resources of the transferred call on network 108 as well as the resources of the call on a media gateway, session border controller, or interface. For example, resources may be freed on one or more trunks to or from gateway 120 after the call is transferred. Additionally, resources of gateway 120, such as ports, bandwidth, and processing power may also be freed after the call is transferred.

Transferring a call may reduce risk to one or more parties associated with network 108. For example, an operator, owner, or other party associated with network may have some liability or responsibility for a call using its network. There is a risk that the call may be sniffed or otherwise monitored while on the network. By transferring the call off of network resources, the parties associated with the network may no longer be responsible for the call.

Gateway 120 may receive the call transfer request as a Session Initiation Protocol (SIP) refer message (e.g., a call transfer request compliant with RFC 3515). The Session Initiation Protocol (SIP) refer message may contain routing information used by the gateway to transfer the call. Gateway 120 may then generate transfer information such as in-band signaling to transfer the call for trunks utilizing in-band signaling. If a call is to be transferred to a trunk utilizing a secondary or D (data) channel for signaling, gateway 120 may generate, request, receive or otherwise obtain the appropriate out-of-band control signaling to transfer the call. Gateway 120 may use one or methods to transfer a call to a network, which may depend on the type of network. For example, Gateway 120 may use a Two B Channel Transfer (TBCT) if transferring to a trunk on a circuit switched network. Gateway 120 may use a SIP Refer message if transferring to a trunk on an IP based network.

The various components of the system 100 as shown in FIG. 1 may be further duplicated, combined and integrated to support various applications and platforms. Additional elements may also be implemented in the systems described above to support various applications. One or more portions of system 100 may be implemented in executable software code stored on a computer readable medium.

Figure 2:
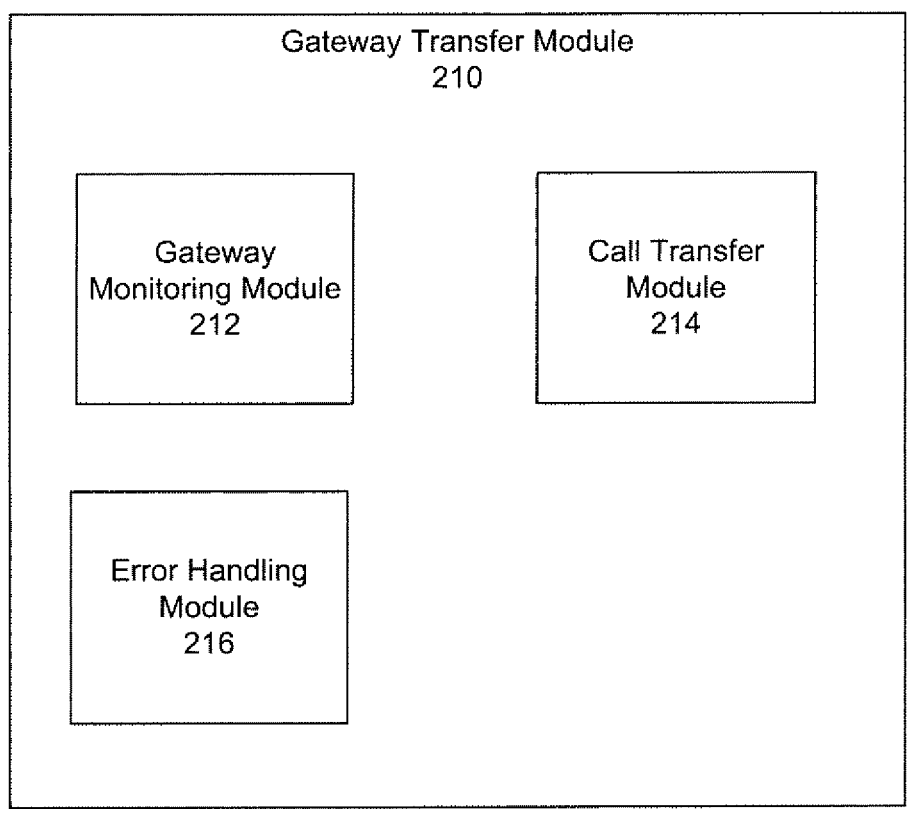
FIG. 2 depicts a block diagram of a module for a system for transferring calls from a packet based phone, in accordance with an exemplary embodiment.

Referring to FIG. 2, a call transfer module 210 for improved call handling is depicted, in accordance with an exemplary embodiment. As illustrated, the call transfer module 210 may contain one or more components including a gateway identification module 212, a call transfer module 214, and an error handling module 216. The call transfer module 210 may identify a gateway, a session border controller, or another interface routing a call to a telecommunication device to allow the call to be transferred back to the same gateway, session border controller, or interface. According to some embodiments, one or more modules of call transfer module 210 may be implemented on a IP phone such as a soft IP Phone implemented in software on a computer, or a hardware based IP Phone.

The gateway identification module 212 may be capable of identifying and storing information identifying call information received during call setup. For example, gateway identification module 212 may identify and store a unique identifier corresponding to a gateway, a Session Border Controller (SBC), or other interface routing a call to a telecommunication device such as telecommunication device 102b. Call setup information may be used to identify a unique identifier associated with the gateway, session border controller, or other interface. Call setup information may include a Session Initiation Protocol (SIP) Re-Invite message information, Session Description Protocol (SDP) information, or other call setup information. The unique identifier corresponding to a gateway, a Session Border Controller (SBC), or other interface routing a call to the telecommunication device 102*b* may include an IP address, a fully qualified domain name, or other unique identifier enabling call routing to the gateway. The unique identifier may be stored in volatile memory, non-volatile memory, or other storage.

The call transfer module 214 may use a stored unique identifier such as, for example, the fully qualified domain name of a gateway such as gateway 120 or gateway 106, or an IP address of a gateway to transfer the call back to the gateway. This may ensure that the outbound call leg from a network, such as network 108, goes through the same media gateway, session border controller, or interface as the inbound call leg to the network instead of an alternate gateway such as gateway 106. This may allow a media gateway, session border controller, or interface to transfer a call off of a network and free the resources of the transferred call on the network as well as the resources of the call on a media gateway, session border controller, or interface. For example, resources may be freed on one or more trunks to or from gateway 120 after the call is transferred. Additionally, resources of gateway 120, such as ports and processing power, may also be freed after the call is transferred.

The error handling module 216 may respond to one or more errors created by a failure to identify a gateway, a failure of a call transfer, a failure of an IP phone, or other errors. The error handling module 216 may provide error trapping and one or more error handling actions. In some embodiments, the error handling module 216 may provide information about a failed network component such as the failure of one or more of network elements 110, 112, 114, 116, and 118. The error handling module 216 may provide information about one or more call routing errors. According to one or more embodiments, error handling module 216 may allow the retry of an operation such as a call transfer. According to some embodiments, if a stored identifier can not be identified a call may be transferred to a default gateway, may be dropped, or may lookup a gateway based on call origination information.

Figure 3:
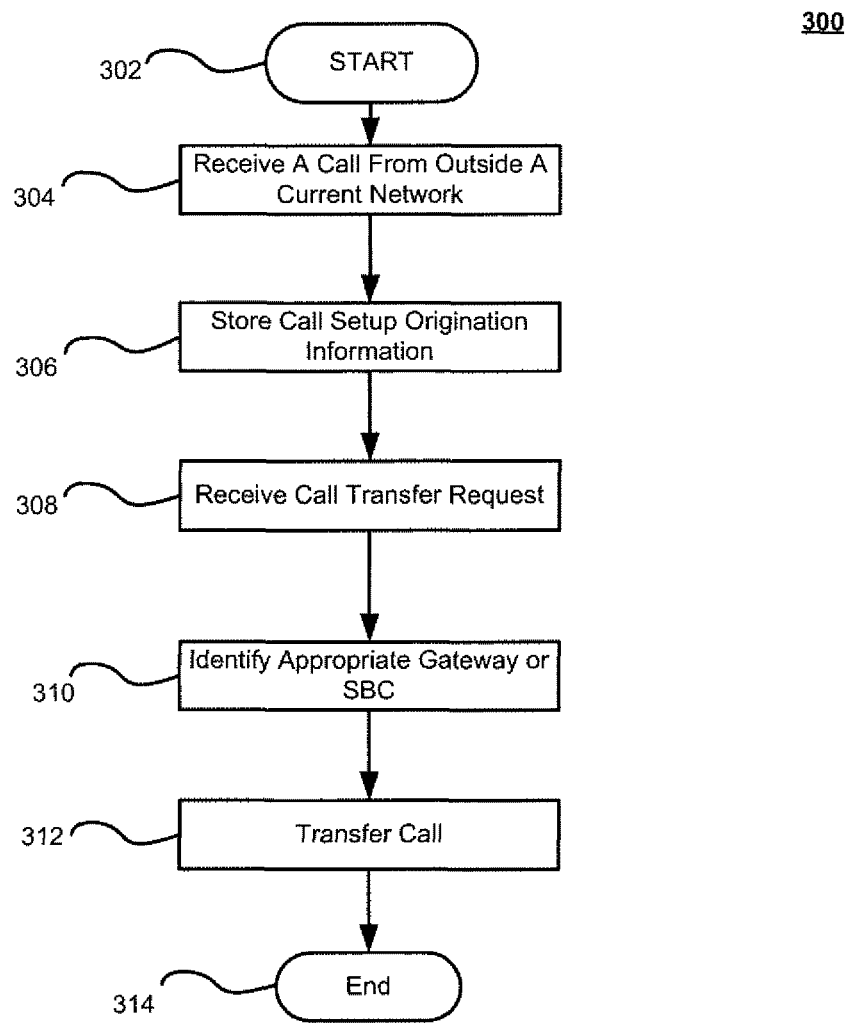
FIG. 3 depicts a flow chart for a method for transferring calls from a packet based phone.

FIG. 3 depicts a flowchart of a method for a method for transferring calls from a packet based phone, according to an exemplary embodiment. The exemplary method 300 is provided by way of example, as there are a variety of ways to carry out methods disclosed herein. The method 300 shown in FIG. 3 may be executed or otherwise performed by one or a combination of various systems. The method 300 is described below as carried out by the system 100 shown in FIG. 1 by way of example, and various elements of the system 100 are referenced in explaining the example method of FIG. 3. Each block shown in FIG. 3 represents one or more processes, methods, or subroutines carried in the exemplary method 300. A computer readable media comprising code to perform the acts of the method 300 may also be provided. Referring to FIG. 3, the exemplary method 300 may begin at block 302.

At block 304, a call may be received at a phone such as, for example, an IP based phone which may be implemented in hardware, software (e.g., an IP communication application running on a computer), or a combination of the preceding. The call may be routed from the external network through a session border controller, a media gateway, or an interface.

At block 306, the phone may receive, parse, and store one or more portions of call information such as, for example, call setup information. For example, the phone may parse and store information uniquely identifying the session border controller, media gateway, or interface routing the call to the phone. Portions of the call setup information parsed may include a Session Initiation Protocol (SIP) Re-Invite message, a Session Description Protocol (SDP) message, or other call setup information. Identifying information parsed from call setup information may include a fully qualified domain name or an IP address of a media gateway or session border controller. Identifying information may be stored in memory or electronic storage associated with the phone. The electronic storage may be volatile memory or non-volatile memory. According to at least one embodiment, identifying information may be stored remote from the phone such as on a gateway or a PBX.

At block 308, the phone may receive a request to transfer the call. The transfer request may be input by a user of the phone.

At block 310, the phone may identify the appropriate media gateway, session border controller, or interface to route the call to. The appropriate media gateway, session border controller, or interface may be the same as the one handling an inbound leg of the call to the phone. This may prevent a call from coming into a network on one media gateway or session border controller and exiting a network from a second media gateway or session border controller, thus using resources of two media gateways and the IP network unnecessarily after the transfer of the call.

At block 312, the phone may transfer the call from the network of the phone to a network of a destination location. The phone transferring the call may identify the media gateway of the inbound leg of the call using one or more stored unique identifiers of the media gateway obtained during call setup. The unique identifier corresponding to a media gateway, a Session Border Controller (SBC), or other interface routing a call to the telecommunication device may include an IP address, a fully qualified domain name, or other unique identifier enabling call routing to the media gateway. The transfer may allow a media gateway, a session border controller, or other interface to transfer the call back to the originating network and free the resources of the network of the phone and the resources of media gateway or session border controller. Freed resources may include, by way of non-limiting example, the resources of the call on a media gateway, session border controller, or interface. Resources may also be freed on one or more trunks to or from a gateway, session border controller, or other interface after the call is transferred. Resources of a gateway, session border controller or other interface freed after the call is transferred may include, by way of non-limiting example, ports, processing power, and bandwidth.

Transferring a call may also reduce risk to one or more parties associated with a network, such as network 108. For example, an operator, owner, or other party associated with network may have some liability or responsibility for a call using its network. There is a risk that the call may be sniffed or otherwise monitored while on the network. By transferring the call off of network resources, the parties associated with the network may no longer be responsible for the call.

At block 314, the method 300 may end.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method, comprising:
    receiving, via a network interface between a first IP network and a second IP network, an IP call at an IP based phone that is within the first IP network, the IP call originating from a second IP network that is outside the first IP network and including call information that comprises setup information and a unique network interface indicator that is associated with the network interface;
    at the IP based phone, parsing the call information to identify the unique network interface indicator associated with the network interface;
    receiving, at the IP based phone, a request to transfer the IP call; and
    transferring, by the IF based phone, the IP call to the network interface using the unique network interface indicator.

2. The method of claim 1, wherein the network interface comprises a media gateway.

3. The method of claim 1, wherein the network interface comprises a session border controller.

4. The method of claim 1, wherein the unique network interface indicator comprises an IP address associated with the network interface.

5. The method of claim 1, wherein the unique network interface indicator comprises a fully qualified domain name of the network interface.

6. The method of claim 1, wherein the call setup information comprises a SIP re-invite message.

7. The method of claim 1, wherein the call setup information comprises a Session Description Protocol information.

8. The method of claim 1, wherein transferring the call is performed using a Two B Channel Transfer.

9. The method of claim 1, wherein transferring the call is performed using a SIP refer request.

10. A non-transitory computer readable media comprising code to perform the acts of the method of claim 1.

11. A system, comprising:
    an IP-based phone communicatively coupled to a network;
    at least one processor communicatively coupled to the IP-based phone, wherein the at least one processor is configured to:
        receive, via a network interface between a first IP network and a second IP network, an IP call originating from a second IP network that is outside the first IP network and including call information that comprises setup information and a unique network interface indicator that is associated with the network interface;
        parse, at the IP-based phone, the call information to identify a unique network interface indicator associated with the network interface;
        receive, at the IP-based phone, a request to transfer the IP call; and
        transfer, by the IP-based phone, the IP call to the network interface using the unique network interface indicator.

12. The system of claim 11, wherein the network interface comprises a media gateway.

13. The system of claim 11, wherein the network interface comprises a session border controller.

14. The system of claim 11, wherein the unique network interface indicator comprises an IP address associated with the network interface.

15. The system of claim 11, wherein the unique network interface indicator comprises a fully qualified domain name of the network interface.

16. The system of claim 11, wherein the call setup information comprises a SIP re-invite message.

17. The system of claim 11, wherein the call setup information comprises a Session Description Protocol information.

18. The system of claim 11, wherein transferring the call is performed using a Two B Channel Transfer.

19. The system of claim 11, wherein transferring the call is performed using a SIP refer request.

* * * * *